US009903606B2

(12) United States Patent
Bunker et al.

(10) Patent No.: US 9,903,606 B2
(45) Date of Patent: Feb. 27, 2018

(54) CONTROLLING PARAMETERS IN A BUILDING

(71) Applicant: Vivint, Inc., Provo, UT (US)

(72) Inventors: Brandon Bunker, Highland, UT (US); Jungtaik Hwang, Draper, UT (US)

(73) Assignee: Vivint, Inc., Provo, UT (US)

( * ) Notice: Subject to any disclaimer, the term of this patent is extended or adjusted under 35 U.S.C. 154(b) by 510 days.

(21) Appl. No.: 14/265,091

(22) Filed: Apr. 29, 2014

(65) Prior Publication Data
US 2015/0308706 A1    Oct. 29, 2015

(51) Int. Cl.
G01M 1/38 (2006.01)
F24F 11/00 (2018.01)
F24D 19/10 (2006.01)
G05B 15/02 (2006.01)

(52) U.S. Cl.
CPC ...... F24F 11/0034 (2013.01); F24D 19/1096 (2013.01); F24F 11/006 (2013.01); F24F 11/0086 (2013.01); G05B 15/02 (2013.01); F24F 2011/0052 (2013.01); F24F 2011/0056 (2013.01); F24F 2011/0071 (2013.01); F24F 2011/0075 (2013.01); G05B 2219/2642 (2013.01)

(58) Field of Classification Search
None
See application file for complete search history.

(56) References Cited

U.S. PATENT DOCUMENTS

| 4,174,064 | A  | 11/1979 | Pratt |
| 5,344,068 | A  | 9/1994  | Haessig et al. |
| 5,668,446 | A  | 9/1997  | Baker et al. |
| 5,699,243 | A  | 12/1997 | Eckel et al. |
| 5,909,378 | A  | 6/1999  | De Milleville et al. |
| 5,924,486 | A  | 7/1999  | Ehlers et al. |
| 5,962,989 | A  | 10/1999 | Baker et al. |
| 5,973,594 | A  | 10/1999 | Baldwin et al. |
| 6,108,614 | A  | 8/2000  | Lincoln et al. |
| 6,216,956 | B1 | 4/2001  | Ehlers et al. |
| 6,263,260 | B1 | 7/2001  | Bodmer et al. |
| 6,377,858 | B1 | 4/2002  | Koeppe |
| 7,469,550 | B2 | 12/2008 | Chapman, Jr. et al. |
| 7,761,186 | B2 | 7/2010  | Fadell et al. |

(Continued)

FOREIGN PATENT DOCUMENTS

| GB | 2448896 A     | 11/2008 |
| KR | 1020130107838 | 10/2013 |

(Continued)

OTHER PUBLICATIONS

International Search Report and Written Opinion of the International Searching Authority for PCT/US2015/029670, dated Sep. 3, 2015.

(Continued)

*Primary Examiner* — Evral E Bodden
(74) *Attorney, Agent, or Firm* — Holland & Hart LLP

(57) ABSTRACT

Methods and systems are described for controlling parameters in a building. According to at least one embodiment, a method for controlling parameters in a building includes using a first sensor type to determine whether the building is occupied and using a second sensor type to determine how reliable the first sensor type determines occupancy.

17 Claims, 11 Drawing Sheets

(56) References Cited

U.S. PATENT DOCUMENTS

| | | | |
|---|---|---|---|
| 7,765,033 | B2 | 7/2010 | Perry |
| 7,918,406 | B2 | 4/2011 | Rosen |
| 8,066,558 | B2 | 11/2011 | Thomle et al. |
| 8,086,352 | B1 | 12/2011 | Elliott |
| 8,111,131 | B2 | 2/2012 | Zaveruha et al. |
| 8,180,492 | B2 | 5/2012 | Steinberg |
| 8,195,313 | B1 | 6/2012 | Fadell et al. |
| 8,214,061 | B2 | 7/2012 | Westrick, Jr. et al. |
| 8,219,251 | B2 | 7/2012 | Amundson et al. |
| 8,237,540 | B2 | 8/2012 | Zaveruha et al. |
| 8,280,536 | B1 | 10/2012 | Fadell et al. |
| 8,335,842 | B2 | 12/2012 | Raji et al. |
| 8,350,697 | B2 | 1/2013 | Trundle et al. |
| 8,386,082 | B2 | 2/2013 | Oswald |
| 8,410,896 | B2 | 4/2013 | Zaveruha et al. |
| 8,412,654 | B2 | 4/2013 | Montalvo |
| 8,457,793 | B2 | 6/2013 | Golding et al. |
| 8,457,796 | B2 | 6/2013 | Thind |
| 8,458,102 | B2 | 6/2013 | Bill |
| 8,478,447 | B2 | 7/2013 | Fadell et al. |
| 8,489,243 | B2 | 7/2013 | Fadell et al. |
| 8,510,255 | B2 | 8/2013 | Fadell et al. |
| 8,511,576 | B2 | 8/2013 | Warren et al. |
| 8,511,577 | B2 | 8/2013 | Warren et al. |
| 8,523,083 | B2 | 9/2013 | Warren et al. |
| 8,532,827 | B2 | 9/2013 | Stefanski et al. |
| 8,538,596 | B2 | 9/2013 | Gu et al. |
| 8,543,244 | B2 | 9/2013 | Keeling et al. |
| 8,544,285 | B2 | 10/2013 | Stefanski et al. |
| 8,554,376 | B1 | 10/2013 | Matsuoka et al. |
| 8,556,188 | B2 | 10/2013 | Steinberg |
| 8,558,179 | B2 | 10/2013 | Filson et al. |
| 8,560,128 | B2 | 10/2013 | Ruff et al. |
| 8,600,562 | B2 | 12/2013 | Oswald |
| 8,620,841 | B1 | 12/2013 | Filson et al. |
| 8,622,314 | B2 | 1/2014 | Fisher et al. |
| 8,627,127 | B2 | 1/2014 | Mucignat et al. |
| 8,630,740 | B2 | 1/2014 | Matsuoka et al. |
| 8,630,741 | B1 * | 1/2014 | Matsuoka ........... H04L 12/2829 700/12 |
| 8,850,348 | B2 | 9/2014 | Fadell et al. |
| 9,245,229 | B2 | 1/2016 | Fadell et al. |
| 2002/0134849 | A1 | 9/2002 | Disser |
| 2007/0032225 | A1 | 2/2007 | Konicek et al. |
| 2008/0079569 | A1 | 4/2008 | Axelsen |
| 2010/0025483 | A1 | 2/2010 | Hoeynck et al. |
| 2011/0181412 | A1 | 7/2011 | Alexander et al. |
| 2011/0253796 | A1 | 10/2011 | Posa et al. |
| 2012/0025717 | A1 | 2/2012 | Klusmann et al. |
| 2012/0066168 | A1 | 3/2012 | Fadell et al. |
| 2012/0072030 | A1 | 3/2012 | Elliot |
| 2012/0085831 | A1 | 4/2012 | Kopp |
| 2012/0086568 | A1 | 4/2012 | Scott et al. |
| 2012/0143356 | A1 | 6/2012 | Berg-Sonne et al. |
| 2012/0143357 | A1 | 6/2012 | Chemel et al. |
| 2012/0143810 | A1 | 6/2012 | Berg-Sonne |
| 2012/0150788 | A1 | 6/2012 | Berg-Sónne et al. |
| 2012/0165993 | A1 | 6/2012 | Whitehouse |
| 2012/0186774 | A1 | 7/2012 | Matsuoka et al. |
| 2012/0259469 | A1 | 10/2012 | Ward et al. |
| 2012/0261481 | A1 | 10/2012 | Donlan |
| 2012/0265501 | A1 | 10/2012 | Goldstein et al. |
| 2012/0271460 | A1 | 10/2012 | Rognli |
| 2012/0299728 | A1 | 11/2012 | Kirkpatrick et al. |
| 2012/0310376 | A1 | 12/2012 | Krumm et al. |
| 2013/0030600 | A1 | 1/2013 | Shetty |
| 2013/0060360 | A1 | 3/2013 | Yamamoto |
| 2013/0151012 | A1 | 6/2013 | Shetty et al. |
| 2013/0173064 | A1 | 7/2013 | Fadell et al. |
| 2013/0245837 | A1 | 9/2013 | Grohman |
| 2013/0268124 | A1 | 10/2013 | Matsuoka et al. |
| 2013/0268125 | A1 | 10/2013 | Matsuoka |
| 2013/0292481 | A1 | 11/2013 | Filson et al. |
| 2013/0297555 | A1 | 11/2013 | Fadell et al. |
| 2013/0325189 | A1 | 12/2013 | Miura |
| 2014/0005837 | A1 | 1/2014 | Fadell et al. |
| 2014/0012821 | A1 | 1/2014 | Fuhrmann et al. |
| 2014/0098596 | A1 | 4/2014 | Poulton et al. |
| 2014/0107846 | A1 | 4/2014 | Li |
| 2014/0239817 | A1 | 8/2014 | Leinen et al. |
| 2015/0070181 | A1 | 3/2015 | Fadell et al. |
| 2015/0264777 | A1 | 9/2015 | Leinen |
| 2015/0285527 | A1 | 10/2015 | Kim et al. |
| 2015/0297778 | A1 | 10/2015 | Conroy et al. |
| 2015/0308706 | A1 * | 10/2015 | Bunker ............... F24F 11/0034 700/275 |
| 2015/0309484 | A1 * | 10/2015 | Lyman ............... G05B 13/0205 700/275 |
| 2015/0323915 | A1 | 11/2015 | Warren et al. |
| 2015/0347916 | A1 | 12/2015 | Warren et al. |
| 2016/0004237 | A1 | 1/2016 | Mohan et al. |
| 2017/0153613 | A1 | 6/2017 | Agarwal |

FOREIGN PATENT DOCUMENTS

| | | |
|---|---|---|
| KR | 1020140047851 | 4/2014 |
| WO | 2009036764 A2 | 3/2009 |
| WO | 2012142477 A3 | 1/2010 |
| WO | 2014033189 | 3/2014 |

OTHER PUBLICATIONS

Allure Energy, Eversense, www.allure-energy.com/mainpage.html, accessed on Apr. 2, 2014, 7 pages.

Ecobee Inc., Ecobee, http://www.ecobee.com/, accessed on Apr. 2, 2014, 5 pages.

Erickson et al., Occupancy Based Demand Response HVAC Control Strategy, University of California Merced, 2010, 6 pages.

Erickson et al., Observe: Occupancy-Based System for Efficient Reduction of HVAC Energy, University of California Merced, Electrical Engineering and Computer Science, 2011, 12 pages.

Gao et al., Spot: A Smart Personlaized Office Thermal Control System, School of Computer Science, University of Waterloow, Waterloo, Ontario, May 24, 2013, 10 pages.

Gupta et al., Adding GPS-Control to Traditional Thermostats:An Exploration of Potential Energy Savings and Design Challenges, Massachusetts Institute of Technology, Cambridge, 2009, 18 pages.

Kleiminger et al., Predicting household occupancy for smart heating control: A comparative performance analysis of state-of-the-art approaches, Institute for Pervasive Computing, ETCH Zurich and Wireless Sensor Networks Lab, TU Darmstadt, 2013, pp. 1-26.

Koehler et al., UbiComp '13 Proceedings of the 2013 ACM international joint conference on Pervasive and ubiquitous computing, New York, 2013, Abstract only, 1 page.

Lee et al., Occupancy Prediction Algorithms for Thermostat Control Systems Using Mobile Devices, IEEE Transactions on Smart Grid 4.3: 1332-40, IEEE, Sep. 2013. Abstract only, 3 pages.

Lu et al., The Smart Thermostat: Using Occupancy Sensors to Save Energy in Homes, Department of Computer Science, University of Virginia and School of Architecture, University of Virginia, Nov. 5, 2011, 14 pages.

Mamidi et al., Smart Sensing, Estimation, and Prediction for Efficient Building Energy Management, Information Sciences Institute, University of Southern California, 2011, 10 pages.

Mamidi et al., Improving Building Energy Efficiency with a Network of Sensing, Learning and Prediction Agents, Information Sciences Institute, University of Southern California, 2012, 8 pages.

Nest Labs, Inc., Nest Thermostat, https://nest.com/thermostat/life-with-nest-thermostat/, accessed on Apr. 2, 2014, 15 pages.

Scott et al., Home Heating Using GPS-Based Arrival Prediction, Microsoft Research, Feb. 24, 2010, 6 pages.

Scott et al., PreHeat: Controlling Home Heating Using Occupancy Prediction, Proceeding, UbiComp '11 Proceedings of the 13th international conference on Ubiquitous computing, Sep. 21, 2011, 10 pages.

Gupta et al., Adding GPS-Control to Traditional Thermostats: An Exploration of Potential Energy Savings and Design Challenges, Massachusetts Institute of Technology, 2009, Abstract only, 6 pages.

Tado Inc., Tado, The Heating App, http://www.tado.com/de-en/,

(56) References Cited

OTHER PUBLICATIONS accessed on Feb. 14, 2014, 8 pages.
Vazquez et al., Impact of user habits in smart home control, IEEE 16th Conference on Emerging Technologies & Factory Automation (ETFA), Sep. 2011, Abstract only, 2 pages.
Wooley et al., Occupancy Sensing Adaptive Thermostat Controls: A Market Review and Observations from Multiple Field Installations in University Residence Halls, 2012 ACEEE Summer Study on Energy Efficiency in Buildings, 2012, pp. 298-311.
Yang et al., Development of multi-agent system for building energy and comfort management based on occupant behaviors, Energy and Buildings 56: 1-7. Elsevier Sequoia S.A., Jan. 2013, Abstract only, 3 pages.
International Search Report and Written Opinion of the International Searching Authority for PCT/US2015/026932, dated Jul. 15, 2015.
English Machine Translation for KR1020140047851, Apr. 23, 2014.
English Machine Translation for KR1020130107838. Oct. 2, 2013.
Supplementary European Search Report for EP Application No. 15786321, dated Nov. 10, 2017 (3 pp.).

\* cited by examiner

CONTROLLING PARAMETERS IN A BUILDING

BACKGROUND

Keeping a furnace of a structure operating at a level high enough to make residents comfortable when there are no occupants in the home can be costly and wasteful. Likewise, keeping lights on when they are not in use also wastes resources and is an additional cost to homeowners and/or building management. Thus, residents in a home turn down the lights and/or lower the temperature in their homes when they leave for an extended amount of time to save costs. For example, if a homeowner takes a week-long vacation, the user often manually adjusts the thermostat to keep the home at a temperature that will prevent the house from freezing or overheating while the homeowner is away. But, such a temperature may not necessarily be a temperature that is comfortable for the homeowner. Thus, when the homeowner returns, the homeowner will readjust the thermostat to return the house to a comfortable temperature.

SUMMARY

Methods and systems are described for controlling parameters in a building. According to at least one embodiment, a computer-implemented method for controlling parameters in a building includes using a first sensor type to determine whether the building is occupied and using a second sensor type to determine how reliable the first sensor type determines occupancy. In some embodiments, the method further includes generating a score that reflects a reliability of the first sensor type for determining occupancy and determining whether to use the first sensor type based on the score. In some cases, an additional sensor type is used to determine occupancy and another score is generated to reflect the reliability of the additional sensor type for determining occupancy.

In some instances, a predictive schedule reflecting occupancy of the building is generated. The predictive schedule may include observation windows that are defined as a time lapse between events that are capable of indicating a change between occupancy and no occupancy of the building. For example, the events are door events. In such an example, the beginning of an observation window may occur when a door opens and/or closes. The system may determine after the door closes whether the building is occupied or not occupied. If the sensors in the building do not detect the presence of an occupant in the home, the system may include determining that any occupant in the home exited the building when the door was open. Thus, the system may determine with confidence that a change in the occupancy of the home will not occur until a door of the home opens again.

A second set of sensors may also be used to determine whether the first set of sensors reliably measures occupancy. For example, if motion detectors fail to detect the presence of an occupant, but a video camera does detect the presence of the occupant, the reliability score associated with the motion detectors may be lowered. Multiple sensors may be used to determine occupancy, and multiple other sensors may be used to determine the reliability of such sensors for determining occupancy. In some examples, the first and/or second sensor type may include a microphone, a motion detector, a security camera, a mobile device, another type of device, or combinations thereof. The most reliable types of sensors may be used to generate the predictive schedule.

The parameters in the building may be adjusted to a conservation level in response to the building having no occupancy based on the predictive schedule. Such parameters may include lighting parameters, climate parameters, security parameters, automation parameters, other types of parameters, and combinations thereof. Further, the parameters may be adjusted to a comfort level based on when the predictive schedule indicates that the home is occupied. For example, the parameters may be adjusted to output a higher temperature in a home twenty minutes before the building is predicted to be occupied. In some examples, the predictive schedule can be overridden when there is an indication that the home will be occupied earlier than predicted. For example, if a user's mobile device is sensed to be moving in the direction of the building such that the user may arrive home earlier than predicted, the system may anticipate a time at which the home will be occupied. Based on the anticipated time, the system may begin to adjust the home's temperatures to a comfortable level before an occupant arrives on site.

In another aspect of the principles described herein, a computing device is configured for controlling the parameters of the building. The computing device includes a processor, memory in electronic communication with the processor, and instructions stored in the memory. The instructions are executable by the processor to use a first sensor type to determine whether the building is occupied and to use a second sensor type to determine how reliable the first sensor type determines occupancy.

In yet another aspect of the principles described herein, a computer program product is used for controlling parameters in a building. The computer-program product includes a non-transitory computer-readable medium having instructions thereon. The instructions are executable by a processor to use a first sensor type to determine whether the building is occupied, use a second sensor type to determine how reliable the first sensor type determines occupancy, generate a score that reflects a reliability of the first sensor type for determining occupancy, and determine whether to use the first sensor type based on the score.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
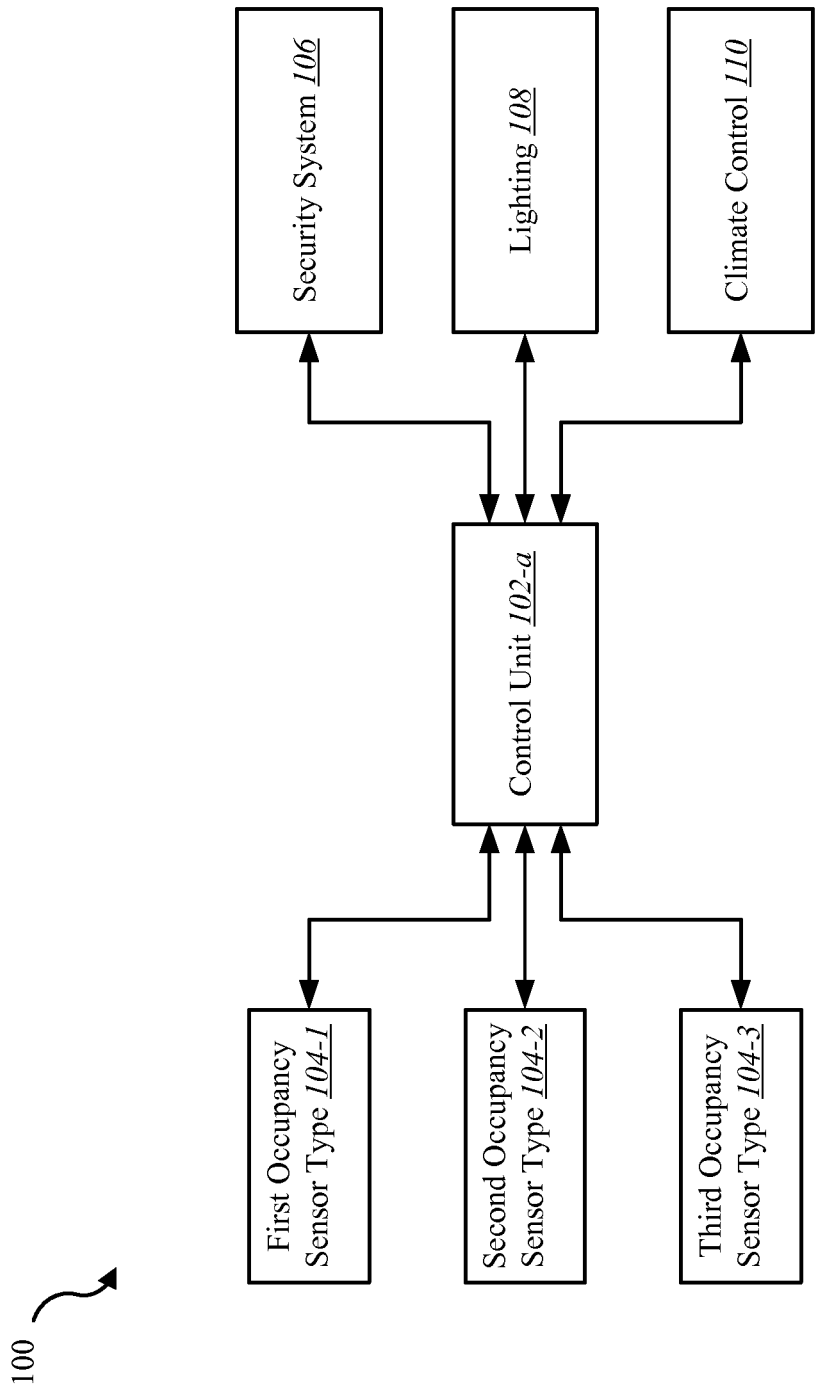
FIG. 1 is a block diagram of an example of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. More specifically, the systems and methods described herein relate to an improved arrangement for controlling parameters in a building. The principles described herein use occupancy sensors to predict a schedule of when the building is occupied. The parameters in the building are adjusted based on the schedule. Further, the reliability of the schedule is scored based on a second set of occupancy sensors to ensure the reliability of the occupancy schedule.

As used herein, the term "module" includes a combination of hardware and programmed instructions that are necessary for performing the designated function of the module. Components of the modules may be located on the same physical device or some of the components may be located at remote locations that are in communication with the other components of the module.

FIG. 1 is a block diagram depicting one embodiment of an environment 100 in which the present systems and methods may be implemented. In some embodiments, the environment 100 includes a control unit 102-a that is in communication with multiple occupancy sensors 104-1, 104-2, 104-3. The control unit 102-a is also in communication with a security system 106, lighting 108, and a climate control 110. The control unit 102-a may be in direct communication with the occupancy sensors 104-1, 104-2, 104-3 or in indirect communication with the occupancy sensors 104-1, 104-2, 104-3 through an intermediate device, such as a cloud based device. a mobile device, another type of device, or combinations thereof.

Any appropriate mechanism for communicating between the control unit 102-a and the occupancy sensors 104-1, 104-2, 104-3 may be used. In some examples, a wireless network is utilized to communicate between the control unit 102-a and the occupancy sensors 104-1, 104-2, 104-3. Examples of networks that may be used include, but are not limited to, local area networks (LAN), wide area networks (WAN), virtual private networks (VPN), wireless networks (using 802.11, for example), and/or cellular networks (using 3G and/or LTE, for example), Bluetooth networks, z-wave networks, other types of networks, or combinations thereof.

The control unit 102-a may control at least a part of the security or automation system. For example, other sensors (not shown) and/or actuators (not shown) may send information to the control unit 102-a where the signals are processed. The such sensors may include, for example, a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, movement sensor, voice sensor, other types of sensors, or combinations thereof. Such actuators may include automated door locks, climate control adjustors, lighting adjusters, sensors activation mechanisms, other types of actuators, or combinations thereof.

The control unit 102-a may make decisions based on the communications from these sensors. For example, based on the information sent from these sensors to the control unit 102-a, the control unit 102-a may make a decision to activate an alarm, adjust a climate control setting, open or close a window, lock or unlock a door, control a security parameter, manage energy consumption, check the status of a door, locate a person or item, control lighting, control cameras, receive notifications regarding a current status or anomaly associated with a building, perform another task, or combinations thereof. In some cases, a decision may be decided at one of the local sensors, and the local sensors may or may not notify the control unit 102-a of the decision and/or resulting action.

In some examples, the control unit 102-a includes a user interface where the user can interact with the control unit 102-a. For example, the user can manually give instructions to the control unit 102-a to adjust a building parameter, install an occupancy sensor 104, or perform another system task.

In addition to the capabilities mentioned above, the control unit 102-a may determine whether the building is occupied. In some examples, a first occupancy sensor type 104-1 is used to determine whether the building is occupied. Any appropriate type of occupancy sensor may be used as the first occupancy sensor type. A non-exhaustive list of occupancy sensor types may include microphones, motion detectors, video cameras, mobile devices, location devices, infrared devices, temperature devices, touch input devices, other types of devices, or combinations thereof.

In an example where a motion detector is used, the control unit 102-a may determine that the building is not occupied when the motion detector fails to detect the presence of an occupant within the building. On the other hand, the control unit 102-a may determine that there is an occupant within the building when the motion detector is triggered.

In addition to the occupancy sensor, an event indicator may indicate to the control unit 102-a when an event occurs that may indicate a change in occupancy. For example, an event indicator may be a sensor that determines when a door to the exterior of the building is open allowing occupants to enter and/or leave the building. In response to the occurrence of such an event, the control unit 102-a may define a beginning of an observation window that is associated with a time stamp that coincides with the closing of the door. The control unit 102-a may make an assumption that occupancy will be consistent until the occurrence of another event. As time progresses from the occurrence of the event, a motion detector (or another type of occupancy sensor) may detect the presence of an occupant. As a result, the control unit 102-a may determine that the building will be occupied until the occurrence of another event. Likewise, if the motion detector (or another type of occupancy sensor) fails to detect an occupant, the control unit 102-a may determine that no occupants are within the building and determine that the building will be unoccupied until the subsequent event.

The subsequent event may be of the same type of event as the initial event. For example, the initial event and the subsequent event may both be opening the front door to a home. In other examples, the initial event is opening a front door, and the subsequent event is the opening of a back door. In yet other examples, the initial event may be opening a door, and the subsequent event may be the opening of a window, the opening of a garage door, another type of event that may indicate a potential change in occupancy, or combinations thereof. While these examples have been described with reference to specific types of events, any appropriate type of event of may be used for either of the initial event and the subsequent event that can indicate a potential change in occupancy.

In some examples, the control unit 102-a determines that there is occupancy or no occupancy after a predetermined time threshold lapses from the occurrence of the event. In other examples, the control unit 102-a calculates an increased confidence that there is no occupancy within the building as the time progresses from the occurrence of the event. In other examples, the control unit 102-a determines that there is or is not occupancy based on measurements throughout the entire observation window.

The control unit 102-a or another type of processing device may generate a schedule based on the occupancy determinations with the observation windows. For example, the occupancy sensors in a household of a single individual who leaves his home around 7:45 a.m. and returns home around 5:15 p.m. may have fairly consistent observation windows Monday through Friday. In such an example, the occupancy sensors may fail to detect the presence of the individual during the observation window that starts around 7:45 a.m. and ends around 5:15 p.m. Based on consistent measurements over time, the control unit 102-a may predict that the household will be unoccupied during this time frame. As a result, when an event occurs around 7:45 a.m. on a week day, the control unit 102-a may determine that the home will be unoccupied until about 5:15 p.m.

Such a generated schedule may vary from day to day. For example, the control unit 102-a may have the capability to determine patterns for each day of the week to account for different schedules on different days of the week. Similarly, the control unit 102-a may have a capability to recognize weekly patterns, monthly patterns, annual patterns, patterns exhibited over less than a week, patterns exhibited over less than a day, other patterns, or combinations thereof.

The occupancy sensors may be positioned throughout an entire building. In other examples, the occupancy sensors are positioned just within areas that are highly indicative of occupancy throughout the entire building.

The second occupancy sensor type 104-2 may be used to determine the reliability of the first occupancy sensor type 104-1. For example, if the first occupancy sensor type 104-1 fails to detect the presence of an occupant, but the second occupancy sensor type 104-2 does detect the presence of the occupant during the observation window, a reliability score associated with the first occupancy sensor type 104-1 may be decreased. By determining the reliability of the sensor types, the control unit 102-a can make accurate occupancy determinations, and therefore, accurate predictive schedules.

In some examples, if the second occupancy sensor type 104-2 fails to find occupancy when the first occupancy sensor type 104-1 does not find occupancy, then the first occupancy sensor type 104-1 may receive a higher reliability score. In some cases, if the first occupancy sensor type 104-1 receives a high enough score, the control unit 102-a may have enough confidence with the first occupancy sensor type 104-1 that the control unit 102-a determines to just use the first occupancy sensor type 104-1. In other situations, the first occupancy sensor type 104-1 does not receive as high of a reliability score. In such situations, the control unit 102-a may use the second occupancy sensor type 104-2 or the third occupancy sensor type 104-3 to determine the occupancy. A different occupancy sensor type can be used to determine the reliability scores for each of the second occupancy sensor type 104-2 or the third occupancy sensor type 104-3. The control unit 102-a may determine to use the sensor type with the highest reliability score.

Testing different occupancy sensor types may be desirable because different occupants may have different patterns that yield some types of occupancy sensors more reliable than others. Further, the location of some occupancy sensors may render some occupancy sensors more reliable than other occupancy sensors regardless of the sensor's type. Other factors may also account for variations in the reliability of different sensors and different sensor types.

The predictive schedule may be used, at least in part, to make adjustments to parameters of the building. For example, if the control unit 102-a receives notice that an event that can indicate a potential change in occupancy has occurred, the control unit 102-a can consult the predictive schedule. If the event coincides with an identified transition into non-occupancy according to the predictive schedule, the control unit 102-a may determine that the building is not occupied. In some examples, the control unit 102-a may continue to monitor the occupancy for a predetermined grace period before making the determination that the building is unoccupied.

If the predictive schedule also predicts that the building will be unoccupied for a sufficient period of time, the control unit 102-a may send commands to various control devices throughout the building to conserve building resources while the building is unoccupied. For example, the control unit 102-a may communicate with lighting 108 and a climate control 110 to reduce energy consumption. Similarly, the control unit 102-a may automatically arm the security system 106 in response to determining that the building is unoccupied. In some examples, appliances like a washing machine may be turned on based on the predictive schedule, while other devices, like a television or a radio, may be turned off based on the predictive schedule. While just a few specific parameters are described as being adjusted based on the predictive schedule, any appropriate parameter adjustment may be made based on the occupancy of the predictive schedule including security parameters, climate parameters, lighting parameters, cleaning parameters, energy consumption parameters, computer parameters, television parameters, door parameters, window parameters, blind parameters, fan parameters, appliance parameters, water parameters, other types of parameters, or combinations thereof.

Figure 2:
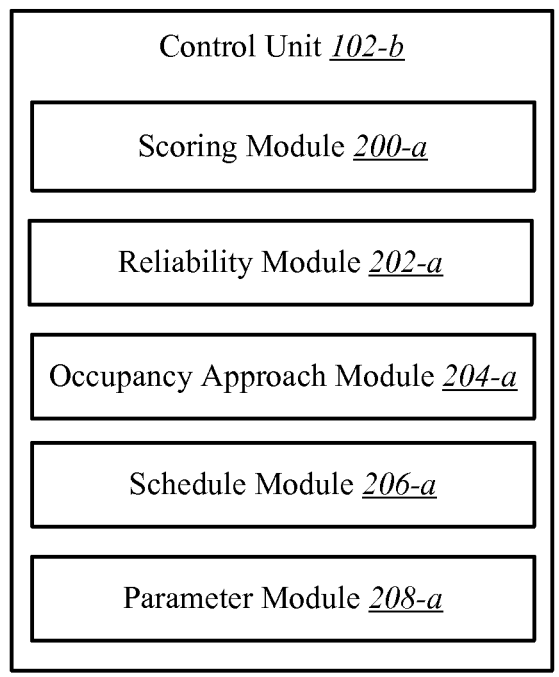
FIG. 2 is a block diagram of an example of a control unit of the environment shown in FIG. 1.

FIG. 2 is a block diagram illustrating one example of a control unit 102-b. In this example, the control unit 102-b has a scoring module 200-a, a reliability module 202-a, an occupancy approach module 204-a, a schedule module 206-a, and a parameter module 208-a.

The scoring module 200-a may be used to determine a reliability score of each type of occupancy sensor. For example, a motion detector can be used as the occupancy detector, and a microphone can be used to determine the reliability of the motion detector. In such an example, if the motion detector fails to detect an occupant, but the occupant is detected by the microphone, the scoring module can generate a reflective score.

Multiple factors may be considered by the scoring module when generating a score. For example, one factor may include the number of times that a second set of sensors detects an occupant when the first set of sensors fails to detect such an occupant. Also, the strength of the detection can be a factor. For example, if the second set of sensors faintly detects of an occupant, the scoring module may place less weight into such a detection, and thereby disregard the faint detection or lower the reliability score of the first set of sensors less than the reliability score would have otherwise been lowered if the second set of sensors had measured a strong detection of the occupant. Further, the time period length that the first set of sensors has been used, the time period length that the second set of sensors has been used, the reliability score of similar sensors in other buildings, other factors, or combinations thereof may also be used.

The reliability module 202-a may determine the reliability of an occupancy sensor type based on the reliability scores. For example, the reliability module 202-a may classify each of the occupancy sensor types as highly reliable, moderately reliable, not reliable. In some examples, if none of the occupancy sensors types are classified as moderately reliable or highly reliable, then the control unit 102-b may send a message to a distributor requesting a technician to resolve the reliability issues.

The occupancy approach module 204-a can determine which of the occupancy sensor types to use to determine occupancy. For example, the occupancy approach module 204-a may select the first occupancy sensor type based on the highest reliability score. In other examples, the location of a type of sensor is also considered as a factor for selecting a sensor type.

In some examples, a single type of occupancy sensor is selected to be used throughout the building. In other examples, the selection process is focused on different areas of the building, such as each room. In such an example, a motion detector occupancy sensor type may be selected for a front room, while a video camera occupancy sensor type is selected for a recreation room, and a microphone occupancy sensor type is selected for a bed room.

The schedule module 206-a generates a predictive schedule based on the historical occupancy patterns recorded over time. The predictive schedule may include schedules that are unique for each day of the week, month, year, other time period, or combinations thereof. The predictive schedule can be stored remotely or locally at the control unit 102-b. Further, the schedule module 206-a can modify the predictive schedule over time as more input is gathered. In some examples, the schedule module 206-a includes a default schedule. In other examples, the schedule module 206-a builds the predictive schedule from scratch based on the determined occupancy patterns.

The parameter module 208-a adjusts parameters in the building based on the predictive schedule. For example, the parameter module 208-a can adjust lighting parameters, climate parameters, security parameters, other parameters in the building, and so forth based on the predictive schedule. The control unit 102-b continues to monitor the building for occupancy. So, even if the predictive schedule indicates that historically no occupant is in the building, but the occupancy sensors are detecting an occupant, the parameter module 208-a can refrain from adjusting parameters to conservation levels. In other words, the real time occupancy detection can override the predictive schedule. The parameter module 208-a may include a policy that it is better to conclude that there is an occupant in the building and risk wasting some energy resources when the building is not occupied than to conclude that the building is unoccupied when the building is actually occupied and risk subjecting an occupant to parameters at the conservation level.

Figure 3:
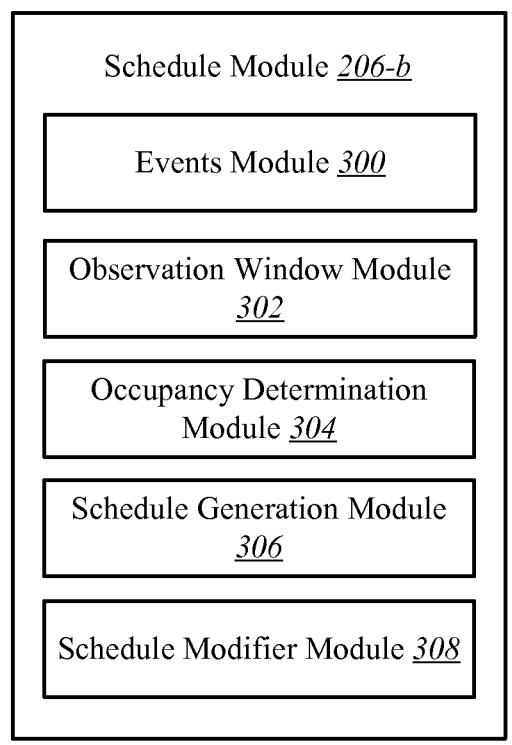
FIG. 3 is a block diagram of an example of an schedule module of the control unit of FIG. 2.

FIG. 3 is a block diagram illustrating one example of a schedule module 206-b. In this example, the schedule module 206-b has an events module 300, an observation window module 302, an occupancy determination module 304, a schedule generation module 306, and a schedule modifier module 308.

The events module 300 determines when events occur that indicate a potential change in the building's occupancy. For examples, the opening and closing of doors, garage doors, sliding doors, windows, fire escapes, other exits or entrances, or combinations thereof may indicate that an occupant has entered or left the building. Such entrances or exits may render the building occupied or unoccupied.

The observation window module 302 may define the time periods where occupancy can change. For example, if a single door of a building opens and closes at just 7:00 am, 12:01 p.m., and 5:34 p.m. during a day, then the observation window module 302 may define that a transition from an occupancy state to a no occupancy state (and vice versa) may occur at each of 7:00 am, 12:01 p.m., and 5:34 p.m. Between each of those potential transitions, the observation window module 302 may the define a single observation window. For example, a first observation window may be between 7:00 a.m. and 12:01 p.m., and a second observation window may be between 12:01 p.m. and 5:34 p.m.

The occupancy determination module 304 determines during which observation windows the building is occupied or unoccupied. Continuing with the example from above, the occupancy determination module 304 may determine that the first observation window is occupied or unoccupied, and independently determine whether the second observation window is occupied or unoccupied. At each potential transition, the occupancy state of the building may or may not change. For example, the building may remain in an occupancy state if an occupant merely opens the door, such as to pick up a newspaper on the door step, and does not leave the house. Likewise, the occupancy state may remain in the same state where just one of multiple occupants leaves the building. Similarly, the occupancy state may also continue to be unoccupied, such as when a potential occupant opens the door to the building, leaves an object in the entry way without staying in the building, and closes the door from the outside.

The occupancy sensors may be used to detect occupancy during the duration of the entire occupancy window. For example, if an observation window is multiple hours long, and the occupancy sensors detect the presence of an occupant once during the entire observation window, the occupancy determination module 304 may determine that the building was occupied for the entire duration. The observation window may include a policy that without an event, such as the opening and closing of a door, that the occupancy state is not likely to change. Also, if the occupancy sensors do not detect the presence of an occupant during the observation window, the occupancy determination module 304 may determine that there is no occupancy during the duration of the observation window.

The schedule generation module 306 may generate the predictive schedule based on the observation windows. In some examples, the predictive schedule is not generated until a trial period is completed where the schedule generation module 306 has sufficient data points to confidently predict the occupancy status of the building. In some examples, the trial period is a week, multiple weeks, a month, multiple months, other time periods, of combinations thereof.

The schedule modifier module 308 continues to analyze the occupancy patterns of the building after the predictive schedule is generated. The schedule modifier module 308 may be used to modify the predictive schedule as appropriate to reflect the additional data analyzed by the schedule modifier module 308. For example, the schedule generation module 306 may determine that the occupants of a building leave around 7:15 a.m. in the morning. However, after the generation of the initial predictive schedule, the occupants may begin leaving around 6:45 a.m. The schedule modifier module 308 may cause the predictive schedule to change based the changes to the occupants' schedule.

Figure 4:
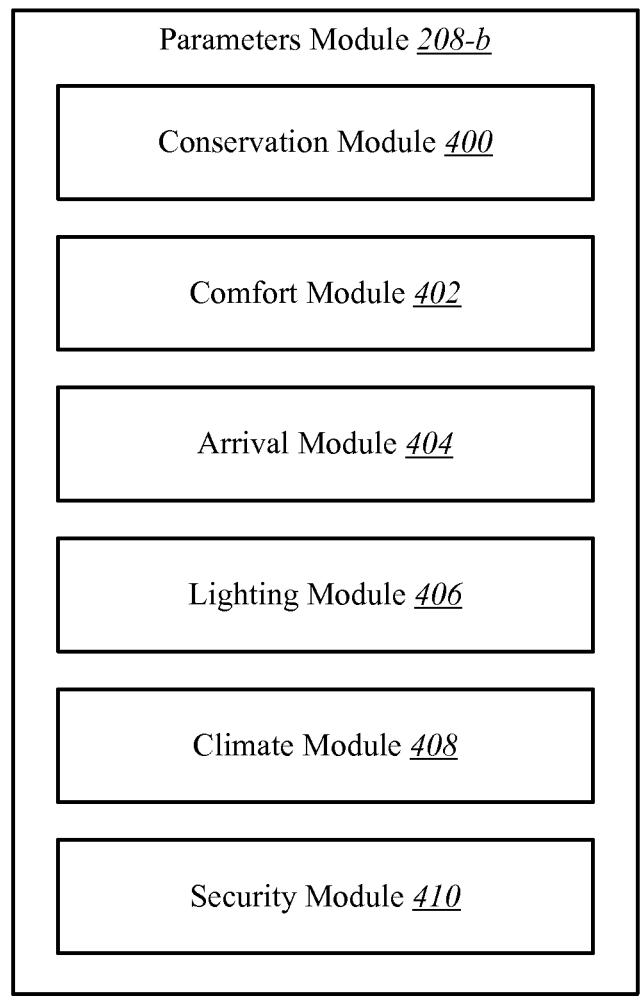
FIG. 4 is a block diagram of an example of a parameters module of the control unit of FIG. 2.

FIG. 4 is a block diagram illustrating one example of a parameter module 208-b. In this example, the parameter module 208-b includes a conservation module 400, a comfort module 402, an arrival module 404, a lighting module 406, a climate module 408, and a security module 410.

The conservation module 400 may cause at least one parameter affecting the building to change based on the predictive schedule. For example, the conservation module 400 may cause the furnace to lower its output to conserve energy while the building is unoccupied. In one scenario, the predictive schedule may indicate that a home will be unoccupied from 8:00 a.m. to 5:00 p.m. each week day. Thus, when an event that potential indicates a transition in the occupancy state of the home occurs around 8:00 am, the conservation module 400 may cause the furnace's parameters to be changed to lower the building's temperature at a level that conserves the building's resources. In some examples, the conservation module 400 may wait for a predetermined time period after the event around 8:00 a.m. to ensure that the occupancy sensors indicate that the building is unoccupied before causing the parameters to change.

In response to detecting the event around 8:00 am, a sensor associated with the event, such as a door or window sensor, sends a message to the control unit 102. In response to the receipt of such a message, the control unit 102 may track the passage of time from the occurrence of the event. If a time threshold is reached where the occupancy sensors do not detect an occupant within the building, the occupancy determination module 304 may determine that the building is not occupied. In some examples, multiple time thresholds correspond with greater degrees of confidence that the building is unoccupied.

Continuing with the example above, if a door event occurs at 4:00 a.m. in the morning, the conservation module 400 may not cause the furnace's parameters to change because the predictive schedule does not indicate that the building will be unoccupied at 4:00 a.m. In such a scenario, the occupant may have actually left his home for the rest of the day or the occupant may have just stepped out for a few minutes. In either case, the schedule modifier module 308 will collect data on such events to determine whether such events are an anomaly or reflect a change the occupancy patterns of the building.

The conservation module 400 may be in communication with any appropriate module. For example, the conservation module 400 may be in communication with the lighting module 406 that controls at least some of the lighting in the building, the climate module 408 that controls at least some of the mechanisms that affect the building's climate, the security module 410 that controls how the premise of the building is monitored for security purposes, other modules, or combinations thereof.

The comfort module 402 may cause parameters affecting the building to change in response to predicting that the building will be occupied. The comfort module 402 may consult with the predictive schedule to determine when the building is predicted to be occupied. In some examples, the parameters are changed prior to the predicted occupancy time so that parameters that take time to achieve can begin to change early enough so that the comfort level is achieved by the time that the occupants arrive. For example, a furnace may take twenty minutes to raise the temperature of a home from the conservation level to a comfort level. In such an example, if the predicted occupancy time is 5:00 p.m., the comfort module 402 may initiate the parameter changes at 4:40 p.m. so that the building is heated to the comfort level at 5:00 p.m.

Similar to the conservation module 400, the comfort module 402 may be in communication with the lighting module 406, the climate module 408, the security module 410, other modules, or combinations thereof. The comfort module 402 may cause the parameters of the building to be such that the occupant's environment within the building is comfortable.

The arrival module 404 accounts for situations where the building is predicted to be occupied at a time different than indicated on the predictive schedule. For example, the arrival module 404 may be in communication with a mobile device of a resident of the building, and the mobile device may include a location mechanism that allows the arrival module 404 to know the current location of that particular resident. If the mobile device's location indicates that the resident is heading home from work earlier than the predictive schedule indicates, the arrival module 404 may calculate an anticipated arrival time for the resident. In such an example, the arrival module 404 may communicate with the comfort module 402 so that changes to parameters can be made at the appropriate time. For example, if the arrival module 404 calculates that the anticipated arrival time is two hours ahead of schedule, the comfort module 402 can shift the time at which it initiates parameter changes ahead by two hours.

Any appropriate approach may be used to calculate the anticipated arrival time. For example, the approach may include using the shortest time period possible from the building to the resident's work place, historical traffic data, current traffic data, the route selected by the resident based on the mobile device's direction and movement, the speed at which the resident appears to be moving based on the mobile device's direction and movement, the weather, the type of transportation the resident generally takes (bicycle, car, bus, mass transit), time of day, time of the week, time of year, community events, other factors, or combinations thereof.

Further, in some examples, the arrival module 404 may be used to determine that a sole resident or all of the residents will be arriving home later than predicted on the predictive schedule. In such an example, the comfort module 402 may cause the parameters to be changed later than indicated on the predictive schedule.

While this example has been described with reference to a mobile device being used to determine the anticipated occupancy of the building, any appropriate mechanism may be used to determine whether the predicted occupancy will be different than the anticipated occupancy. For example, mobile device, phones, electronic tablets, watches, and other devices with location mechanisms may be used. Further, mechanism may be used where the user can input into a cloud based device through the internet his or her anticipated arrival at home. In yet other examples, video cameras, motion detectors, or other types of devices can be stationed at a resident's work place to determine when the resident leaves work for the evening.

Figure 5:
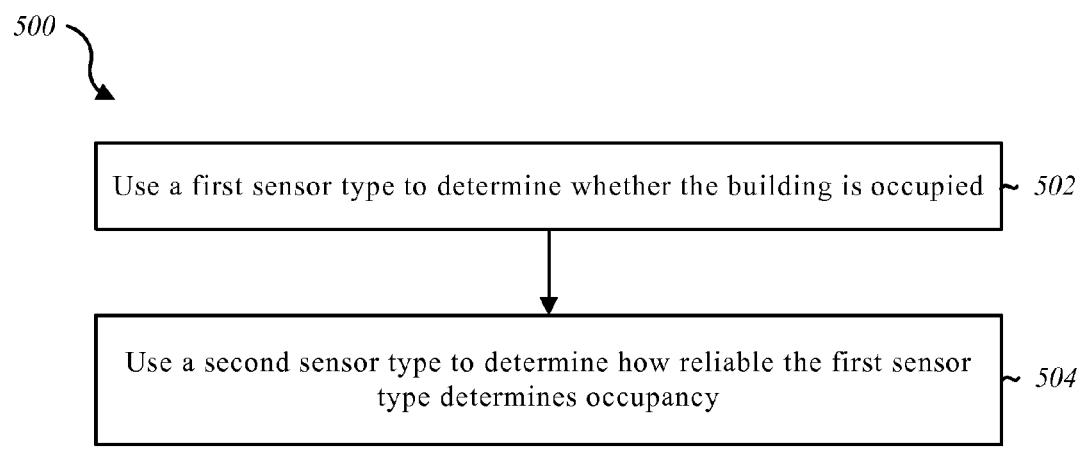
FIG. 5 is a flow diagram illustrating an example of a method for controlling parameters of a building.

FIG. 5 is a flow diagram illustrating one embodiment of a method 500 for controlling parameters of a building. In this example, the method 500 includes using 502 a first sensor type to determine whether a building occupancy state has changed and using 504 a one or more additional sensor types to determine occupancy or to determine how reliable the first sensor type determines occupancy. Such a method 500 may be implemented with a control unit 102 shown in FIGS. 1 and/or 2. In other examples, method 500 may be performed generally by the environment 100 shown in FIG. 1.

At block 502, a first sensor type is used to determine whether the building occupancy state has changed. Such a sensor type may be any appropriate type of sensor that is capable of determining whether an occupant is present within the building. For example, a motion detector may be used to detect the presence of an occupant.

At block 504, a second sensor type can be used to determine how reliable the first sensor type determines occupancy. Continuing with the example above where the first type of sensor is a motion detector, the second sensor type may be a microphone, a video camera, another type of sensor, or combinations thereof. If the second sensor type detects the presence of an occupant and the first sensor type fails to detect the presence of the occupant, the first sensor type may be deemed too unreliable to detect occupancy.

In some examples, the second sensor type is used during the entire time that the first sensor type is used. In other examples, the second sensor type is used for just a subset of the time that the first sensor type is used. For example, the second sensor type may be used at random or periodically to confirm that the first sensor type is working adequately.

Figure 6:
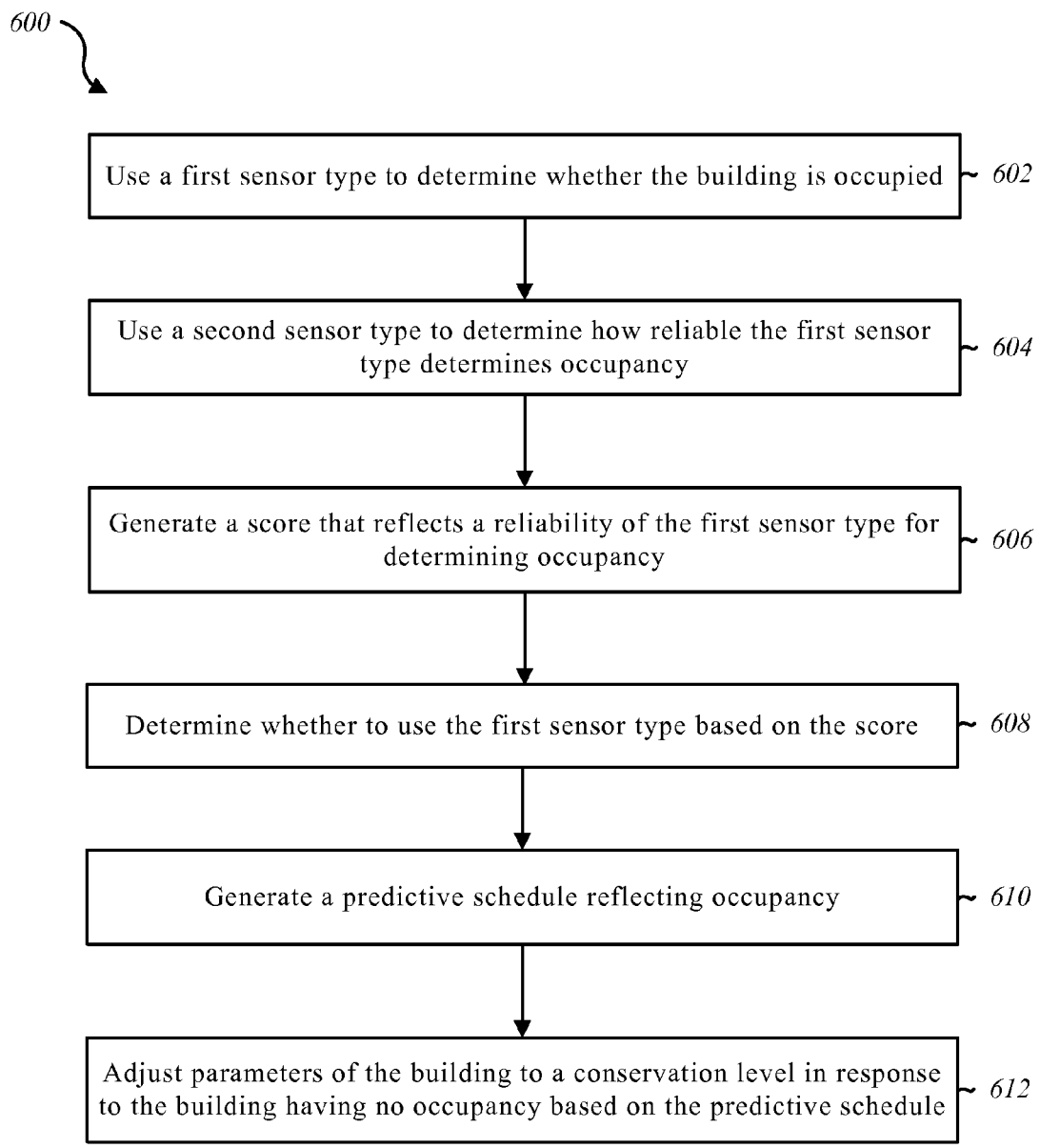
FIG. 6 is a flow diagram illustrating an example of a method for controlling parameters of a building.

FIG. 6 is a flow diagram illustrating one embodiment of a method 600 for controlling parameters in a building. In this example, the method 600 includes using 602 a first sensor type to determine whether the building is occupied, using 604 a second sensor type to determine how reliable the first sensor type determines occupancy, generating 606 a score that reflects a reliability of the first sensor type for determining occupancy, determining 608 whether to use the first sensor type based on the score, generating 610 a predictive schedule reflecting occupancy, and adjusting 612 parameters of the building to a conservation level in response to the building having no occupancy based on the predictive schedule. Such a method 600 may be implemented with a control unit 102 shown in FIGS. 1 and/or 2. In other examples, method 600 may be performed generally by the environment 100 shown in FIG. 1.

At block 606, a score for the first sensor type is generated based on the findings of the second sensor type. Such a reliability score may be increased for each observation window where the second sensor type detects the same occupancy as the first sensor type. Similarly, the reliability score may be reduced in response to the second sensor type detecting occupancy that the first sensor type failed to detect.

At block 608, a determination is made as to whether to use the first sensor type. Such a determination may be based on the reliability score associated with the first sensor type. Further, the reliability of the first sensor type may be compared to the reliability of other sensors types. In such an example, the system may include a policy that indicates that the sensor type with the highest score is to be the selected sensor type. In some examples, more than one sensor type is selected and such sensors work together to detect occupancy.

At block 610, the predictive schedule is generated that reflects the historical occupancy patterns of the building. The input for such a predictive schedule is based on the data recorded by the selected occupancy sensor.

At block 612, the parameters of the building are adjusted to a conservation level in response to the building having no occupancy based on the predictive schedule. The occupancy sensors can also provide real time information to corroborate that there is no occupancy currently detected. For example, the parameters may not be adjusted just because the predictive schedule predicts that the building will be unoccupied if a real time occupancy sensor detects the presence of an occupant since the last door or window event.

In some examples, a policy may include considering the building occupied in real time even when a substantial time duration lapses between occupancy detection and a predicted unoccupied window because the absence of a door or window event indicates that it is unlikely that the occupancy status of the home could have changed. In such an example, the occupant may not be detected because the occupant is performing an activity that is difficult to detect, such as activities that produce little motion or sound like reading a book or sleeping. On the other hand, if an event occurs that indicates a potential transition in the occupancy state of the building where such an event coincides with a transition into an unoccupied state according to the predictive schedule, then the parameters of the building may be adjusted to a conservation level.

Figure 7:
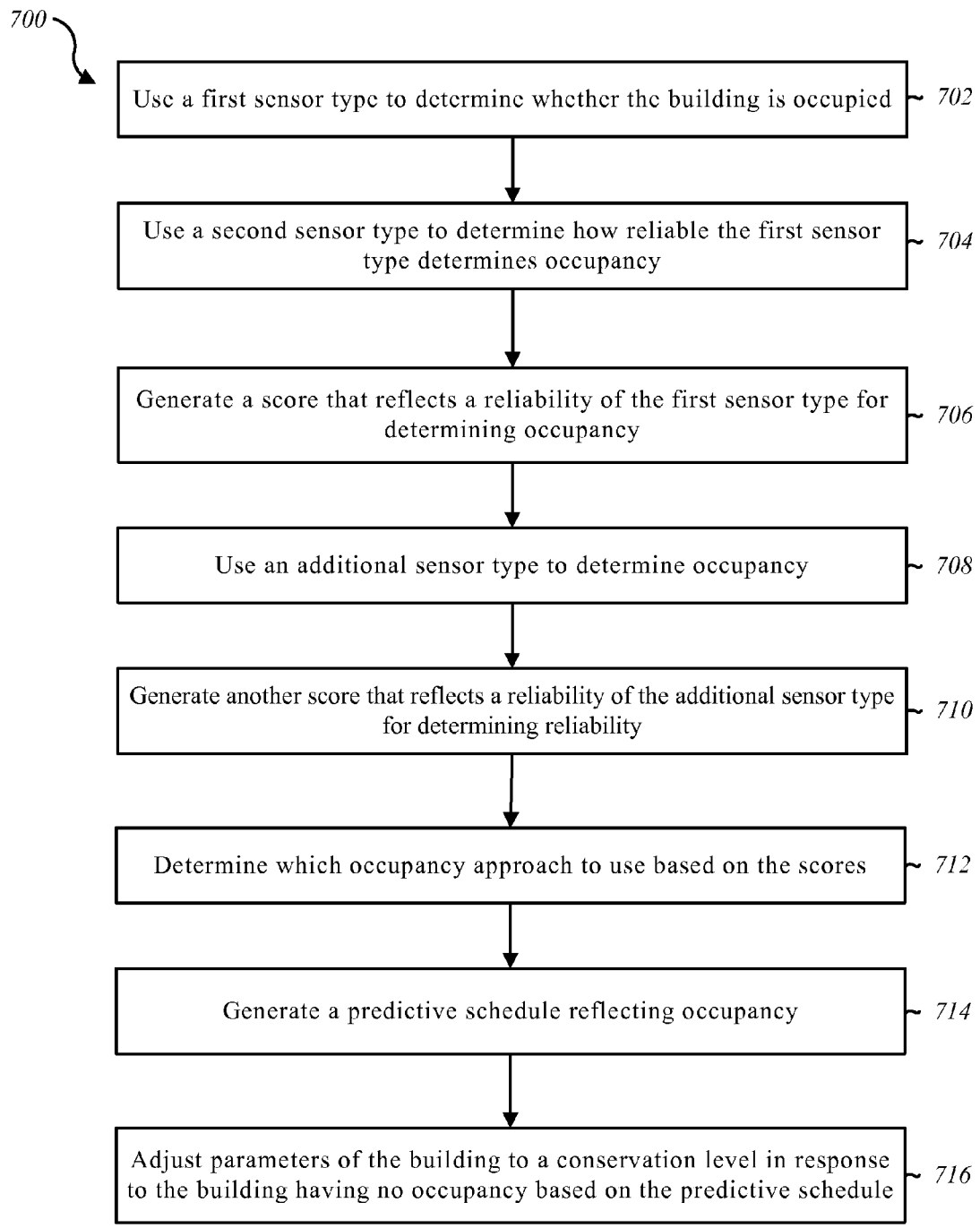
FIG. 7 is a flow diagram illustrating an example of a method for controlling parameters of a building.

FIG. 7 is a flow diagram illustrating one embodiment of a method 700 for controlling parameters of a building. In this example, the method 700 includes using 702 a first sensor type to determine whether the building is occupied, using 704 a second sensor type to determine how reliable the first sensor type determines occupancy, generating 706 a score that reflects a reliability of the first sensor type for determining occupancy, using 708 an additional sensor type to determine occupancy, generating 710 another score that reflects a reliability of the additional sensor type for determining occupancy, determining 712 which occupancy approach to use based on the scores, generating 714 a predictive schedule reflecting occupancy, and adjusting 716 parameters of the building to a conservation level in response to the building having no occupancy based on the predictive schedule. Such a method 700 may be implemented with a control unit 102 shown in FIGS. 1 and/or 2. In other examples, method 700 may be performed generally by the environment 100 shown in FIG. 1.

At block 708, another sensor type is used to determine occupancy. In such an example, the other sensor type may be used at the same time as the first sensor type is being tested or at a different time. Further, the other sensor type may be the second sensor type that is used to score the first sensor type. In other examples, the second sensor type is used to score both the first sensor type and the other sensor type.

At block 710, an additional reliability score is calculated for the other sensor type. This score may be compared to the reliability score assigned to the first sensor type. In some examples, if the reliability score of the first sensor type is higher than the reliability score associated with the other sensor type, the first sensor type may be selected to be used to detect occupancy for generating the predictive schedule. Likewise, the other sensor type may be selected to be used to generate the predictive schedule based on having a higher reliability score.

Figure 8:
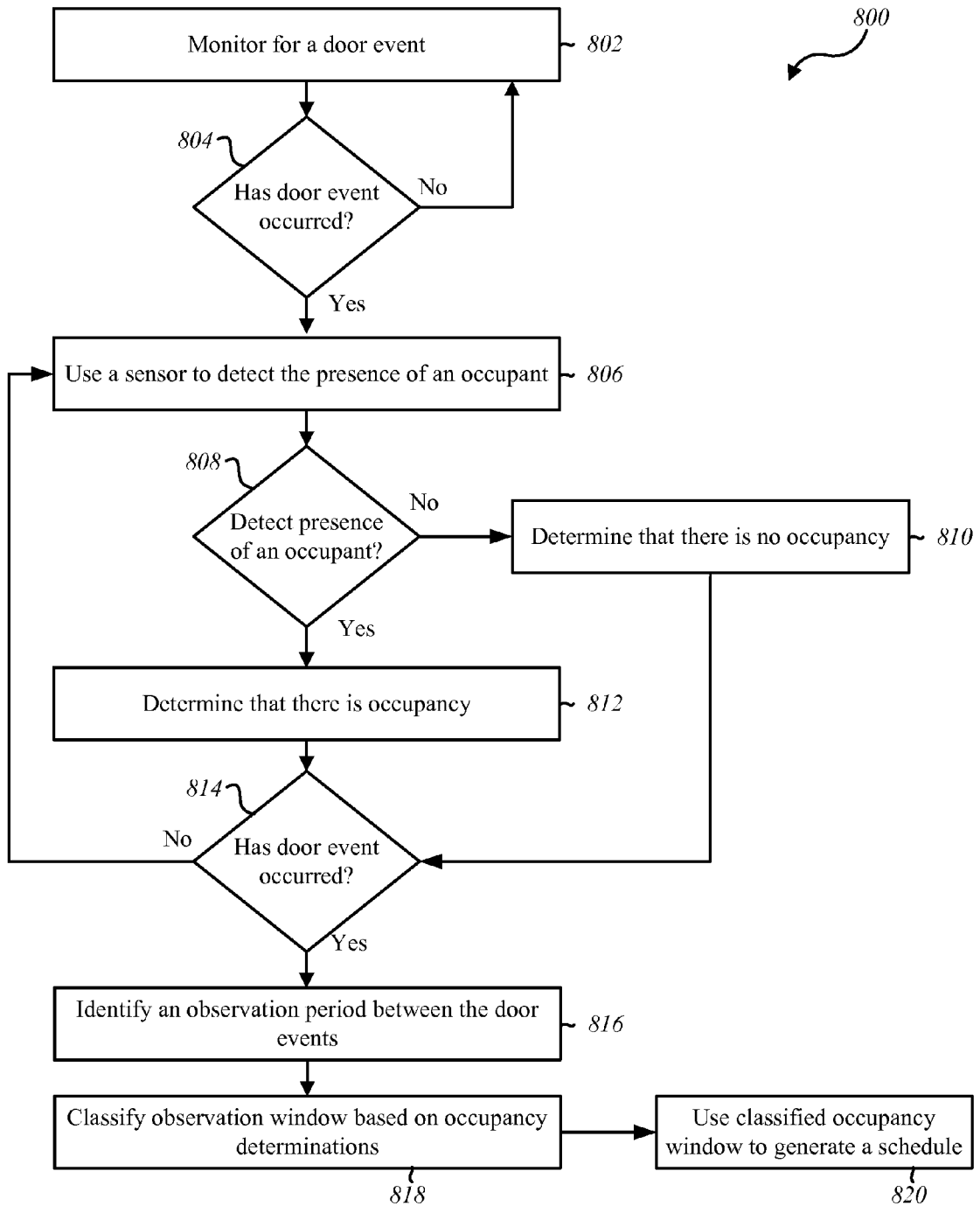
FIG. 8 is a flow diagram illustrating an example of a method for generating a schedule.

FIG. 8 is a flow diagram illustrating one embodiment of a method 800 for controlling parameters in a building. Such a method 800 may be implemented with a control unit shown in FIGS. 1 and/or 2. In other examples, method 800 may be performed generally by the environment 100 shown in FIG. 1.

At block 802, a sensor monitors for door events, such as opening and closing the doors. At decision 804, a determination is made as to whether a door event has occurred. If not, the method 800 includes continuing to monitor 802 for a door event. On the other hand, if a door event has been detected, a sensor is used 806 to detect the presence of an occupant.

At decision 808, a determination is made as to whether the presence of an occupant has been detected. If there is no detection, then the method 800 includes determining 810 that there is no occupancy. On the other hand, if the presence of an occupant is detected, then the method 800 determines 812 that the building is occupied.

At decision 814, a determination is made about whether a subsequent door event has occurred. If not, the sensor continues to be used 806 to detect the presence of an occupant. On the other hand, if a subsequent door event has occurred, an observation window is identified 816 between the two door events. At block 818, the observation window is classified based on the occupancy determination made above, and the classified occupancy window is used 820 to generate the predictive schedule.

Figure 9:
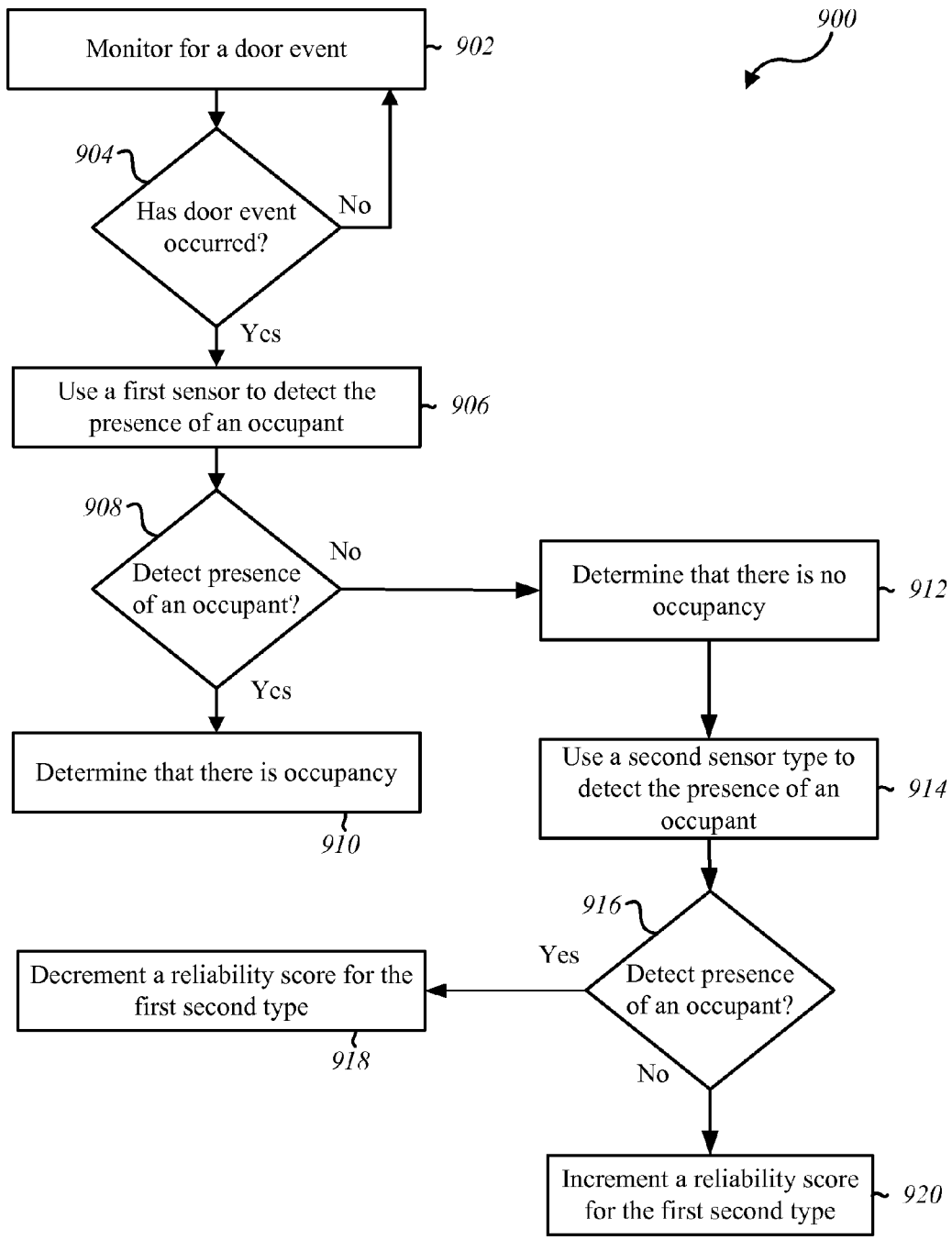
FIG. 9 is a flow diagram illustrating an example of a method for generating a reliability score.

FIG. 9 is a flow diagram illustrating one embodiment of a method 900 for controlling parameters in a building. Such a method 900 may be implemented with a control unit 102 in FIGS. 1 and/or 2. In other examples, method 900 may be performed generally by the environment 100 shown in FIG. 1.

At block 902, a sensor monitors for door events, such as opening and closing the doors. At decision 904, a determination is made as to whether a door event has occurred. If not, the method 900 includes continuing to monitor 902 for a door event. On the other hand, if a door event has been detected, a first sensor is used 906 to detect the presence of an occupant.

At decision 908, a determination is made as to whether the presence of an occupant is detected. If so, the method 900 includes determining 910 that the building is occupied. If not, the method 900 includes determining 912 that the building is unoccupied. Further, a second sensor type is used to detect 914 the presence of an occupant.

At decision 916, a determination is made as to whether the second sensor type detects the presence of an occupant. If so, a reliability score of the first sensor type is decremented 918. On the other hand, if the second sensor type also does not detect the presence of an occupant, then the reliability score is incremented 920 because the findings of the first sensor type are corroborated with the findings of the second sensor type.

Figure 10:
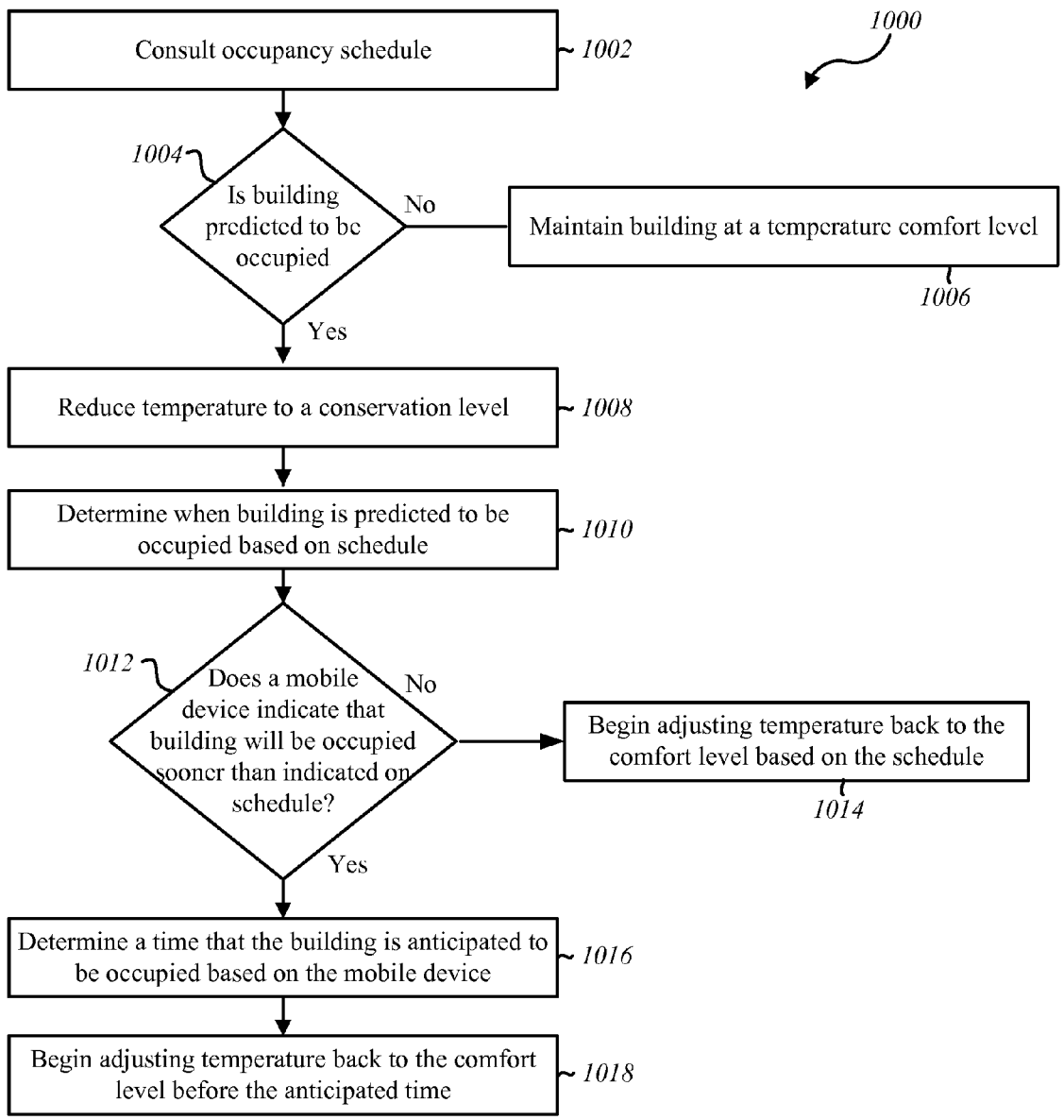
FIG. 10 is a flow diagram illustrating an example of a method for adjusting parameters in a building.

FIG. 10 is a flow diagram illustrating one embodiment of a method 1000 for controlling parameters of a building. Such a method 1000 may be implemented with a control unit 102 in FIGS. 1 and/or 2. In other examples, method 1000 may be performed generally by the environment 100 shown in FIG. 1.

At block 1002, an occupancy schedule is consulted. At decision 1004, a determination is made as to whether the building is predicted to be occupied. If not, the temperature comfort level is maintained 1006. On the other hand, if the predictive schedule indicates that the building is not occupied, the temperature is reduced 1008 to a conservation level. Further, the method includes determining 1010 when the building is predicted to be occupied based on the predictive schedule.

At decision 1012, a determination is made as to whether a mobile device indicates that the building will be occupied sooner than indicated on the schedule. If the mobile device does not indicate that the building will be occupied sooner than predicted, the temperature is adjusted 1014 to the comfort level based on the predictive schedule. On the other hand, if the mobile device indicates that the building will be occupied sooner than predicted, a time is determined 1016 that the building is anticipated to be occupied based on the mobile device. Further, the method 1000 includes adjusting the temperature back to the comfort level before the anticipated time.

Figure 11:
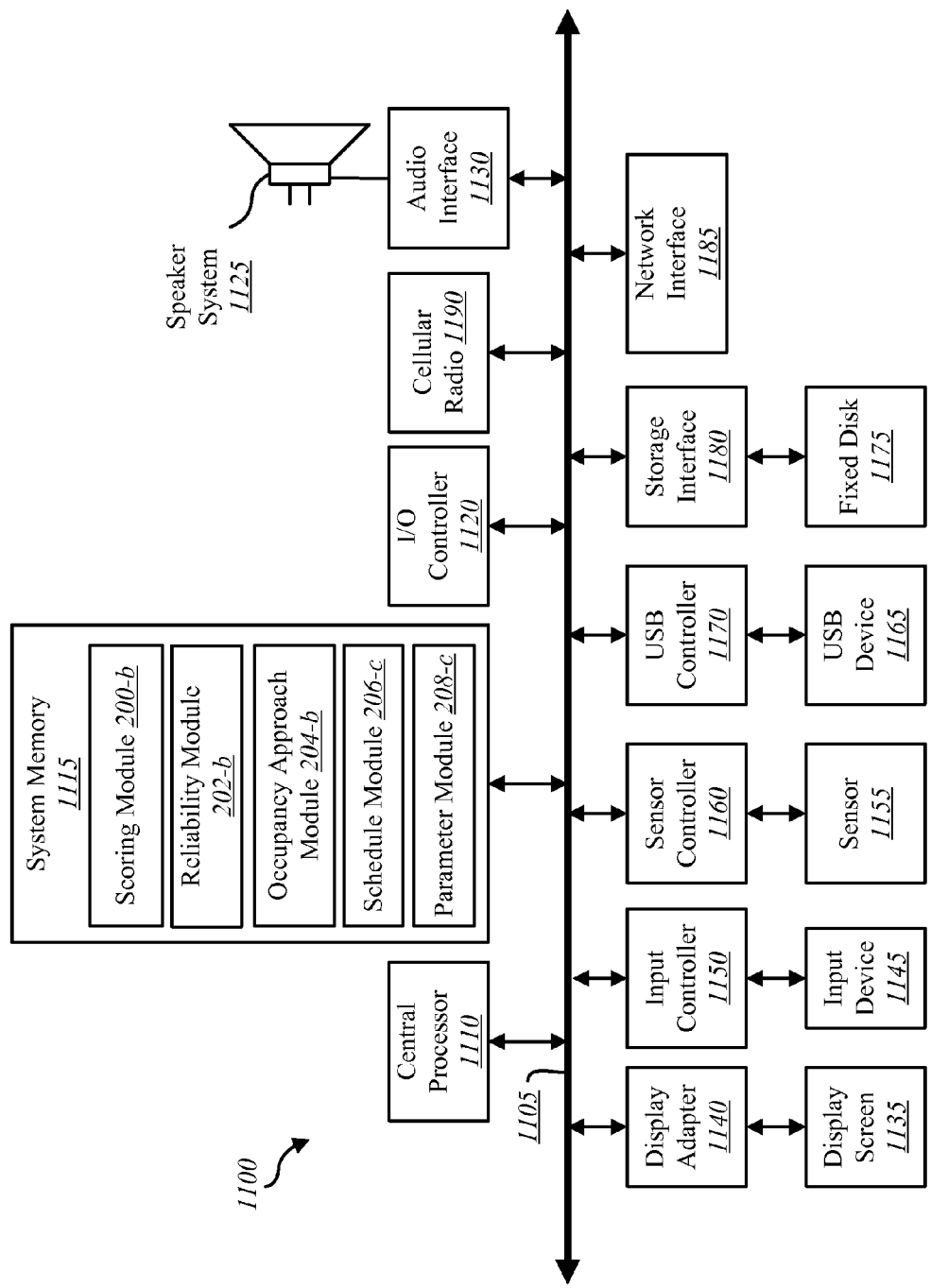
FIG. 11 is a block diagram of a computer system suitable for implementing the present systems and methods of FIG. 1.

FIG. 11 depicts a block diagram of a controller 1100 suitable for implementing the present systems and methods. The controller 1100 may be an example of the control unit 102-a in FIG. 1. In one configuration, controller 1100 includes a bus 1105 which interconnects major subsystems of controller 1100, such as a central processor 1110, a system memory 1115 (typically RAM, but which may also include ROM, flash RAM, or the like), an input/output controller 1120, an external audio device, such as a speaker system 1125 via an audio output interface 1130, an external device, such as a display screen 1135 via display adapter 1140, an input device 1145 (e.g., remote control device interfaced with an input controller 1150), multiple USB devices 1165 (interfaced with a USB controller 1170), one or more cellular radios 1190, and a storage interface 1180. Also included are at least one sensor 1155 connected to bus 1105 through a sensor controller 1160 and a network interface 1185 (coupled directly to bus 1105).

Bus 1105 allows data communication between central processor 1110 and system memory 1115, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a scoring module 200-b, a reliability module 202-b, an occupancy approach module 204-b, a schedule module 206-c, and a parameter module 208-c may be used to implement the present systems and methods may be stored within the system memory 1115. These modules may be an example of the modules illustrated in FIG. 2. Applications resident with controller 1100 are generally stored on and accessed via a non-transitory computer readable medium, such as a hard disk drive (e.g., fixed disk 1175) or other storage medium. Additionally, applications can be in the form of electronic signals modulated in accordance with the application and data communication technology when accessed via network interface 1185.

Storage interface 1180, as with the other storage interfaces of controller 1100, can connect to a standard computer readable medium for storage and/or retrieval of information, such as a fixed disk drive 1175. Fixed disk drive 1175 may be a part of controller 1100 or may be separate and accessed through other interface systems. Network interface 1185 may provide a direct connection to a remote server via a direct network link to the Internet via a POP (point of presence). Network interface 1185 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1100 wirelessly via network interface 1185. In one configuration, the cellular radio 1190 may include a receiver and transmitter to wirelessly receive and transmit communications via, for example, a cellular network.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equip.m.ent monitor, and so on). Conversely, all of the devices shown in FIG. 11 need not be present to practice the present systems and methods. The devices and subsystems can be interconnected in different ways from that shown in FIG. 11. The aspect of some operations of a system such as that shown in FIG. 11 are readily known in the art and are not discussed in detail in this application. Code to implement the present disclosure can be stored in a non-transitory computer-readable medium such as one or more of system memory 1115 or fixed disk 1175. The operating system provided on controller 1100 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:
1. A method for controlling parameters in a building, comprising:
using a first sensor type to determine an occurrence of an event associated with a change in a current occupancy state;
identifying the current occupancy state of the building based on the occurrence of the event;

using a predictive schedule to determine a time when the current occupancy state of the building is expected to change;

determining an updated occupancy state after a predetermined time threshold lapses from the occurrence of the event using an additional sensor type different from the first sensor type;

calculating a confidence score for the first sensor type based at least in part on determining the updated occupancy state after the predetermined time threshold lapses;

updating the predictive schedule based at least in part on calculating the confidence score for the first sensor type; and adjusting parameters to a pre-determined comfort level based on the updated occupancy state after the predetermined time threshold lapses.

2. The method of claim 1, further comprising:
determining whether to use the first sensor type based on the confidence score.

3. The method of claim 1, further comprising:
generating a second confidence score that reflects a reliability of the additional sensor type for determining occupancy.

4. The method of claim 1, further comprising:
updating the predictive schedule reflecting occupancy, the updated predictive schedule being based on the current occupancy state of the building and the expected change in the current occupancy state of the building.

5. The method of claim 4, wherein updating the predictive schedule comprises:
determining at least one observation window defined as the time threshold between the event indicating a change of the current occupancy state of the building.

6. The method of claim 5, wherein the event is the opening or closing of a door.

7. The method of claim 4, further comprising:
adjusting parameters of the building to a conservation level in response to the building having no occupancy based on the updated predictive schedule.

8. The method of claim 7, wherein the parameters include lighting parameters, climate parameters, security parameters, or combinations thereof.

9. The method of claim 1, further comprising:
adjusting parameters to the pre-determined comfort level in anticipation of an arrival of an occupant earlier than the expected change in the current occupancy state of the building.

10. The method of claim 1, wherein the additional sensor type includes a microphone, a motion detector, a security camera, a mobile device, or combinations thereof.

11. A computing device configured for controlling parameters in a building, comprising:
a processor;
memory in electronic communication with the processor; and
instructions stored in the memory, the instructions being executable by the processor to:
use a first sensor type to determine an occurrence of an event associated with a change in a current occupancy state;
identify the current occupancy state of the building based on the occurrence of the event;
use a predictive schedule to determine a time when the current occupancy state of the building is expected to change;
determine an updated occupancy state after a predetermined time threshold lapses from the occurrence of the event using an additional sensor type different from the first sensor type;
calculate a confidence score for the first sensor type based at least in part on determining the updated occupancy state after the predetermined time threshold lapses;
update the predictive schedule based at least in part on calculating the confidence score for the first sensor type; and
adjust parameters to a pre-determined comfort level based on the updated occupancy state after the predetermined time threshold lapses.

12. The computing device of claim 11, wherein the first sensor type is a door sensor.

13. The computing device of claim 11, wherein the instructions are further executable by the processor to:
update the predictive schedule reflecting occupancy, the updated predictive schedule being based on the current occupancy state of the building and the expected change in the current occupancy state of the building.

14. The computing device of claim 13, wherein the instructions are further executable by the processor to:
adjust parameters of the building to a conservation level in response to the building having no occupancy based on the updated predictive schedule.

15. The computing device of claim 13, wherein the instructions are further executable by the processor to:
adjust parameters to the pre-determined comfort level in anticipation of an arrival of an occupant earlier than the expected change in the current occupancy state of the building.

16. A computer-program product for controlling parameters in a building, the computer-program product comprising a non-transitory computer-readable medium having instructions thereon, the instructions being executable by a processor to:
use a first sensor type to determine an occurrence of an event associated with a change in a current occupancy state;
identify the current occupancy state of the building based on the occurrence of the event;
use a predictive schedule to determine a time when the current occupancy state of the building is expected to change;
determine an updated occupancy state after a predetermined time threshold lapses from the occurrence of the event using an additional sensor type different from the first sensor type;
calculate a confidence score for the first sensor type based at least in part on determining the updated occupancy state after the predetermined time threshold lapses;
update the predictive schedule based at least in part on calculating the confidence score for the first sensor type; and
adjust parameters to a pre-determined comfort level based on the updated occupancy state after the predetermined time threshold lapses.

17. The computer-program product of claim 16, wherein the instructions are further executable by the processor to:
update the predictive schedule reflecting occupancy, the updated predictive schedule being based on the current occupancy state of the building and the expected change in the current occupancy state of the building.

* * * * *